United States Patent [19]

Reisgies et al.

[11] Patent Number: 4,516,530
[45] Date of Patent: May 14, 1985

[54] MILK SWEEP METHOD AND APPARATUS FOR AUTOMATED MILKING SYSTEMS

[75] Inventors: Rolf W. Reisgies; Robert Camren, both of Waunakee, Wis.

[73] Assignee: Germania Dairy Automation, Inc., Waunakee, Wis.

[21] Appl. No.: 542,005

[22] Filed: Oct. 14, 1983

[51] Int. Cl.³ ............................................. A01J 5/04
[52] U.S. Cl. ............................... 119/14.08; 119/14.14
[58] Field of Search ............... 119/14.02, 14.08, 14.14, 119/14.18

[56] References Cited

U.S. PATENT DOCUMENTS

| | | | |
|---|---|---|---|
| 2,199,821 | 5/1940 | Hapgood . | |
| 2,680,445 | 6/1954 | Hemminger | 134/102 |
| 3,461,845 | 8/1969 | Peterson | 119/14.18 |
| 3,690,300 | 9/1972 | Tonelli | 119/14.14 X |
| 3,713,423 | 1/1973 | Sparr, Sr. | 119/1 |
| 3,786,782 | 1/1974 | Abrahamson et al. | 119/14.08 |
| 3,814,056 | 6/1974 | Maehans | 119/14.08 |
| 3,991,716 | 11/1976 | Reisgies | 119/14.08 |
| 4,034,713 | 7/1977 | Umbaugh | 119/14.02 |
| 4,149,489 | 4/1979 | Umbaugh et al. | 119/14.18 |
| 4,168,677 | 9/1979 | Brown | 119/14.18 |
| 4,222,346 | 9/1980 | Reisgies | 119/14.08 X |

FOREIGN PATENT DOCUMENTS 7702113  6/1978  Netherlands ................... 119/14.08

Primary Examiner—Robert P. Swiatek
Attorney, Agent, or Firm—Isaksen, Lathrop, Esch, Hart & Clark

[57] ABSTRACT

An automated milking system is disclosed in which the milking vacuum applied from a vacuum line (18) through a milk flow valve (13) and the milk hose (17) to a teat cup cluster (12) is initially shut off after automatic detacher controls (11) provide a signal indicating the end of milking. Milk sweep controls (10) provide a signal to the drive cylinder (24) of the milk flow valve (13) either a selected period of time after the end of milking or upon receipt of milk sweep initiate signal from a condition responsive sensor in the parlor to cause the milk flow valve to be shifted to the position in which vacuum is applied to the milk hose (17) and teat cup cluster (12), thereby drawing out rest milk remaining in these components. After a selected period of time, the milk valve (13) shuts off the milking vacuum in response to a signal from the milk sweep controller (10) and may thereafter shift to a position in which backflushing solution from a backflush system (14) is passed through the milk flow valve (13) into the milk hose (17) and teat cup cluster (12) to flush out these components.

19 Claims, 2 Drawing Figures

MILK SWEEP METHOD AND APPARATUS FOR AUTOMATED MILKING SYSTEMS

FIELD OF THE INVENTION

This invention pertains generally to the field of automated milking systems and particularly to those systems in which backflushing of the milking equipment is carried out.

BACKGROUND ART

To combat mastitis infections which can be transmitted from cow to cow by contact with teat cup inflations used on several cows during one milking, backflushing systems have been developed which flush out the milk hose and teat cup cluster with hot water or a disinfectant solution after each cow has completed milking. Backflush systems have become particularly common with automatic milking machine detachers (or take-offs)—devices which sense when the cow is milked out and automatically remove the teat cups from the cow. The backflush operation may be automatically initiated in response to the signal provided by the automatic take-off which indicates that milking has been completed.

While backflush systems have become common because of their contribution to the control of mastitis, their use can result in the loss of a cumulatively significant amount of milk. This loss occurs when the hose and cluster are flushed out because there is typically about an ounce of rest milk left in the milking claw and another ounce in the milk hose when the milking machine is removed from the cow by an automatic detacher. Automatic take-off equipment generally shuts off the milking vacuum to the cow before the teat cups are removed to minimize irritation of the teats as the cups are drawn away from the cow. The shut-off of the vacuum also prevents contamination of the teat cups by material which could be drawn into the cups if the milking vacuum were left on.

The amount of milk lost per milking by backflushing is a small percentage of the total amount of milk given by the cow, since an average cow may yield 25 pounds of milk at each milking. However, the loss can become significant in larger dairy operations. If two ounces of milk are lost per milking, twice a day, approximately 91 pounds of milk are lost per milking cow per year as a result of the backflushing of the milking equipment. In addition, the final or rest milk given by the cow is higher than average in fat content. For example, if an average holstein gives milk in the range of 3.5 to 4% fat, the rest milk will often be as high as 7 to 8% fat. Under present milk purchasing rules, the dairymen are paid a premium for each additional percentage point of fat content. The rest milk remaining in the claw and milk hose therefore has a greater than average value to the dairyman. If the cows are milked three times a day rather than two, an even greater percentage of the total milk production will be lost in the backflush operation since the amount of rest milk remains constant while the production per milking generally is less than when the cows are milked twice daily.

SUMMARY OF THE INVENTION

In accordance with the invention, the milking vacuum to the teat cups is shut off before the teat cups are removed from the cow as in ordinary detacher operations. After the teat cup cluster is removed from the cow and drawn by detaching apparatus to a location where contaminating material cannot enter the cup inflations, the milking vacuum is turned back on for a short period of time to pull the rest milk from the teat cup cluster and milk hose past the milk flow valve. After sufficient time has elapsed to allow substantially all of the rest milk to be drawn out, the milking vacuum is shut off and the backflush system turned on in the customary manner to flush out the milk hose, claw, and inflations.

Apparatus in accordance with the invention may carry out the milk sweep operation at each individual milking stall with the milk sweep sequence inaugurated by the signal from an automatic detacher indicating the end of milking. The apparatus includes milk sweep control means for receiving the end of milking signal and cutting off the milking vacuum, delaying a preselected period of time to allow removal of the cluster, and then issuing a control signal to the drive cylinder of the milk flow valve to switch it from the shut-off or backflush position to the vacuum position. After passage of a preselected period of time during which milking vacuum is applied to the milk hose and cluster, the control means switches again to cause the milk flow valve to switch to its position cutting off the milking vacuum and preferably placing the milk hose in communication with a line from the backflush system.

In a preferred embodiment, the apparatus operates pneumatically, receiving an air pressure signal from the detacher controller indicating the end of milking, providing the end of milking signal to a timing circuit which builds up to a prescribed trigger pressure after the selected delay time sufficient to switch a main control valve. The control valve is initially in a first position providing the end of milking air pressure signal to a drive cylinder which switches the milk flow valve to shut off the milking vacuum. Upon switching of the main control valve by a pilot responsive to the air pressure built up in the timing circuit, the main control valve provides a drive signal to the drive cylinder to cause it to switch the milk flow valve to its first position in which the milking vacuum is supplied to the teat cup cluster. Simultaneously, the pressure signal passed through the main control valve is provided to a second timing circuit which slowly builds up pressure directed to a second pilot on the control valve to cause the same to switch at a preselected pressure, thereby moving the control valve back to its first position, and consequently causing the drive cylinder to switch the milk flow valve to cut off the milking vacuum.

The milk sweep operation may also be carried out on all of the milking machines in a milking parlor simultaneously. The milk sweep initiation signal may be provided in response to a condition in the parlor—for example, the opening of the exit gate indicating that milking has been completed on the a group of cows in the parlor. The milk sweep initiate signal is provided to a group milk sweep control which distributes the signal to a local control at each of the stalls. Each of the local controls responds to the milk sweep initiate signal to switch the milk flow valve from a position in which the milking vacuum is cut off to a position in which the milk hose and cluster receive the milking vacuum. After a preselected period of time, the group sweep controller provides a shut-off signal to each of the local controllers causing them to switch the milk flow valve back to a position in which the milk hose to the teat cup cluster is preferably in communication with a line leading to the backflush system. Again, the control circuitry is preferably pneumatically operated so that air pressure signals are used to control operation of the milk flow valve.

Further objects, features and advantages will be apparent from the following detailed description taken in conjunction with accompanying drawings.

BEST MODE FOR CARRYING OUT THE INVENTION

Figure 1:
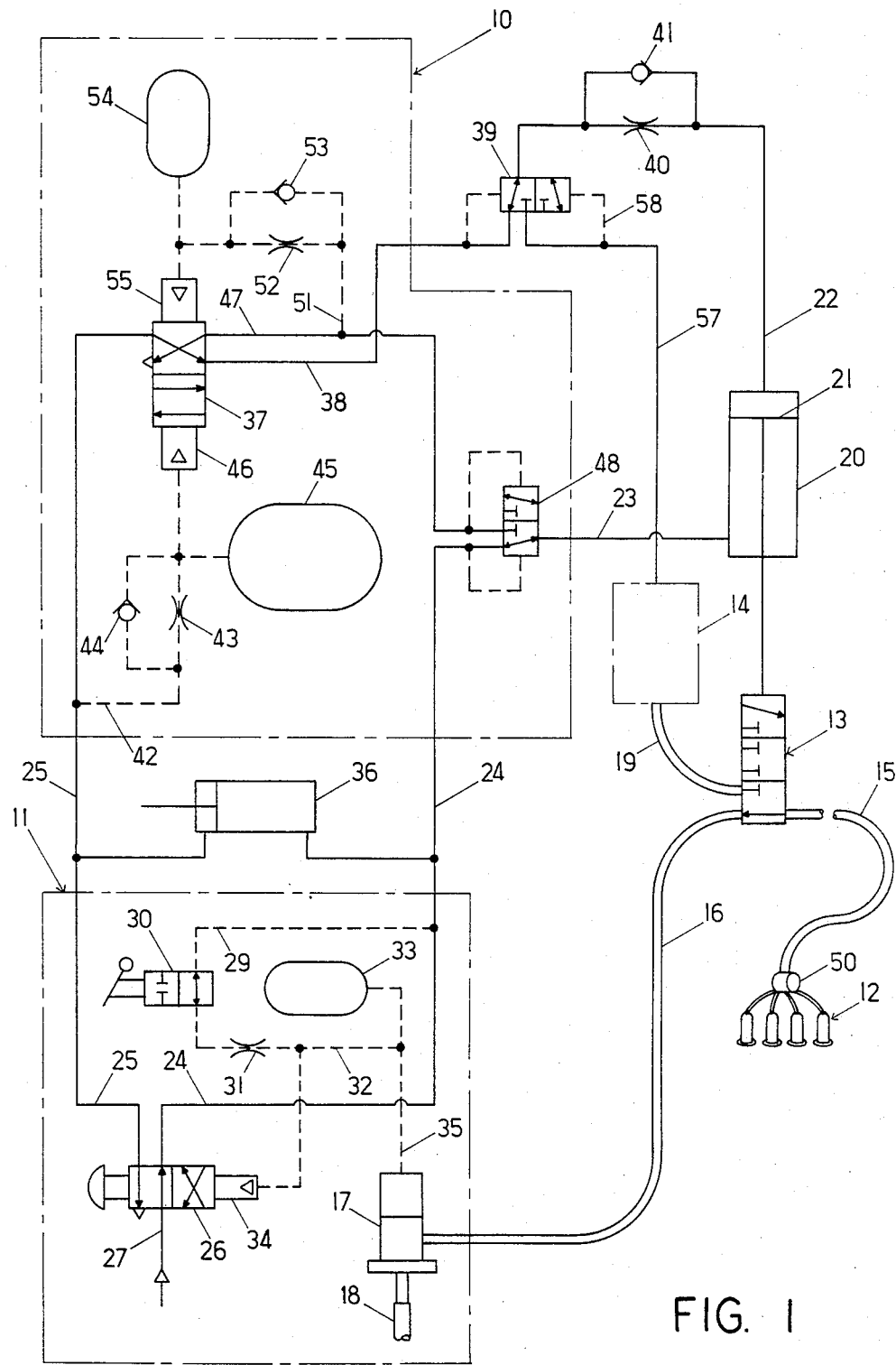
FIG. 1 is a somewhat simplified schematic view of the milk sweep apparatus of the invention shown in conjunction with the controls for a pneumatically operated detaching apparatus.

With reference to the drawings, a schematic view of a milk sweep timing and control circuit for a preferred embodiment of the milk sweep apparatus is shown generally at 10 in FIG. 1 in conjunction with the controls 11 for an automatic detacher, a teat cup cluster 12, a milk flow valve 13, and a backflush system generally indicated by the block labeled 14. The apparatus of FIG. 1 is designed to operate with air pressure signals, so that no potentially dangerous or disturbing electrical signals need be introduced into the milking parlor. The control circuit 11 for the detacher shown in FIG. 1 is intended to be illustrative of control circuits typically used, and its operation is described in greater detail in prior U.S. Pat. No. 3,991,716. Similarly, the operation of the backflushing system 14 and the controls therefore may be of any of the various types of backflushing systems presently known, an example of which is shown in prior U.S. Pat. No. 4,222,346.

The milk flow valve 13 shown has three positions; in the first position, shown in FIG. 1, the milk hose 15 from the cluster 12 is in communication with the vacuum line 16 leading to a milk flow sensor 17, which is itself connected to the source of the milking vacuum through a line 18. In the position of the valve 13 shown in FIG. 1, the backflush solution supply line 19 from the backflush system 14 is blocked, so that even if fluid is supplied on the line 19, it will not be passed by the valve 13. The valve 13 is operated as shown by a two-way drive cylinder 20 which has its piston 21 connected to the valve 13. When the cylinder 20 is supplied with air under pressure from a control line 22, it will drive the backflush valve 13 through a neutral position, in which all ports are blocked and the milking vacuum is cut off from the milk hose 15, to its backflush position in which the backflush supply line 19 is in communication with the milk hose 15 and the vacuum line 16 is blocked. Air under pressure supplied through a second control line 23 to the drive cylinder 20, while the line 22 is exhausted, will drive the valve 13 back to its first position in which the vacuum line 16 and the milk hose 15 are in communication.

The pneumatic detacher control means shown within the block 11 operates to provide a signal on an output line 24 in the form of high air pressure indicating the beginning of the milking cycle. When a determination is made by the detacher controls that the cow has been milked out, the pressure in the line 24 is dropped to atmospheric and a high pressure signal is provided on a second output line 25 indicating the end of milking. The exemplary air pressure operated detacher control 11 includes a manually operable control valve 26 which receives air pressure from a line 27 and, in the milking position illustrated in FIG. 1, directs the air pressure from the line 27 to the output line 24. In this position, the valve 26 also exhausts the line 25 to ambient air pressure. When the valve 26 is turned to its "on" or milking position, shown in FIG. 1, by the operator, the air pressure signal from the line 24 is provided through a control line 29, a manual on-off valve 30, and a restrictor 31 to a line 32 which is in communication with an air chamber 33, a snap action pilot 34 of the valve 26, and an output signal line 35 from the milk flow sensor 17. The milk flow sensor 17 operates to relieve pressure in the line 35 by venting the air in the line to the atmosphere as long as milk is flowing from the cow. When milk stops flowing from the cow, air pressure builds up at a predetermined rate as the chamber 33 is pressurized, until the pressure exceeds the pressure at which the pilot 34 snaps, after which the valve 26 is moved to its second position in which higher air pressure is supplied to the line 25, and in which the line 24 is vented to atmosphere. The high pressure end of milking signal on the line 25 also causes the piston of a two-way air cylinder 36 to be driven inwardly. The piston of the cylinder 36 is connected by a rod, rope, or chain to the cup cluster 12 to draw the same away from the cow in a conventional manner.

On a conventional detacher system, the output line 25 carrying the end of milking signal is directly connected to the line 22 supplying the drive cylinder 20 to cause it to switch the valve 13 to shut off the milking vacuum when the teat cup cluster is to be removed from the cow. Similarly, the output line 24 carrying a pressure signal indicating the beginning of milking is conventionally directly connected to the line 23. A high pressure signal on the line 24 would thus cause the cylinder 20 to move the valve 13 to its first position in which milking vacuum is supplied to the milk hose 15.

In the milk sweep apparatus of the present invention, however, the signal on the line 25 indicating the end of milking is supplied through a main control valve 37, in its initial position shown in FIG. 1, to a line 38 leading to a shuttle valve 39 and thence through a restrictor 40, with check valve 41, to the line 22; the air pressure from the line 22 drives the piston 21 within the cylinder 20 to switch the valve 13 from the milking position to an intermediate vacuum cut-off position or to the backflush position. The air pressure signal on the line 25 is also provided to a first control line 42 through a restrictor 43 with paralleled check valve 44 to an air chamber 45 and a snap-action pilot 46 of the main control valve 37. When the valve 37 is in its position shown in FIG. 1, a second output line 47 leading from the valve is exhausted to the atmosphere. The line 47 is connected to a shuttle valve 48, the output of which is connected to the line 23. If the shuttle valve is in position to provide communication between the lines 23 and 47, the air within the cylinder 20 can be exhausted through the valve 37 as the piston 21 moves downwardly in the cylinder 20.

After a preselected period of time, e.g. 15 seconds, the pressure building up within the chamber 45 exceeds the pressure at which the pilot 46 snaps, causing the pilot to drive the valve 37 to its switched position in which the line 25 is in communication with the second output line 47 and in which the first output line 38 is exhausted to the atmosphere. The high pressure signal on the line 47, transmitted through the shuttle valve 48 to the line 23, causes the air cylinder 20 to drive back upwardly, drawing the milk flow valve 13 to its initial position in which the milking line 16 provides a vacuum draw on the milk hose 15 and the teat cup cluster 12. Air within the cylinder 20 is exhausted through the line 22 as the piston 21 moves upwardly. The line 22 vents to the atmosphere through the check valve 41, shuttle valve 39, line 38 and main control valve 37. The vacuum applied to the milk hose 15 and the milking claw 50 and inflations of the teat cup cluster 12 draws out most of the remaining rest milk into the milking line 16. To allow adequate air flow through the cluster and milk hose, it is preferred that the teat cup inflations have a reasonably rigid stem such that the inflations remain open while the vacuum draw is applied thereto, allowing air to be drawn in through the inflations. Since the cluster 12 will be withdrawn from the cow and supported above the floor at this time, contaminating material will not be drawn into the inflations.

The air pressure signal on the line 47 is also supplied to a second control line 51 and through a restrictor 52, with paralleled check valve 53, to a timing chamber 54 and a second snap action pilot 55 on the main valve 37. The pilot 55 is designed to snap after a selected pressure is built up within the relatively small timing chamber 54, for example, after three to ten seconds, to drive the valve 37 back to its first position shown in FIG. 1. To allow the valve 37 to be driven back to its initial position by the pilot 55, the first pilot 46 is preferably of the type that applies a force to the valve 37 to switch its position when the selected switching pressure is reached, but thereafter relieves the pilot pressure so that it exerts no further force on the valve body. This release of pressure allows the pilot 55, operating on the other side of the valve body, to switch the valve 37 without impedance, even though a high pressure signal remains on the first control line 42. When the valve 37 reaches its initial position, the lines 47 and 51 are connected to atmosphere, and the pressure built up within the chamber 54 is quickly relieved by the opening of the check valve 53. The high pressure now appearing on the line 38 is transmitted through the shuttle valve 39, the restrictor 40, and the supply line 22 to the drive cylinder 20 to cause it to switch the milk flow valve 13 to its backflush position in which the backflush line 19 is in communication with the milk hose 15.

The backflush system 14 may also operate independently of the milk sweep apparatus by providing a high pressure signal on an output line 57 to the shuttle valve 39. An internal pilot line 58 within the shuttle valve switches the valve to its position in which the line 57 supplies high pressure through the restrictor 40 and the supply line 22 to the air cylinder 20. After completion of the aforedescribed milk sweep cycle, the backflush controller 14 provides a signal on the line 57 to ensure that the valve 13 is in its backflushing position, and the backflush unit 14 turns on to supply backflushing solution through the line 19 in a normal backflush operating sequence. At the time the backflushing begins, the milk remaining after milking in the milk hose 15 and the teat cup cluster 12, including the customary metal or metal and glass milking claw 50, has been drawn out into the milking system at least as far as the vacuum line 16, and cannot be washed out with the backflush solution.

Figure 2:
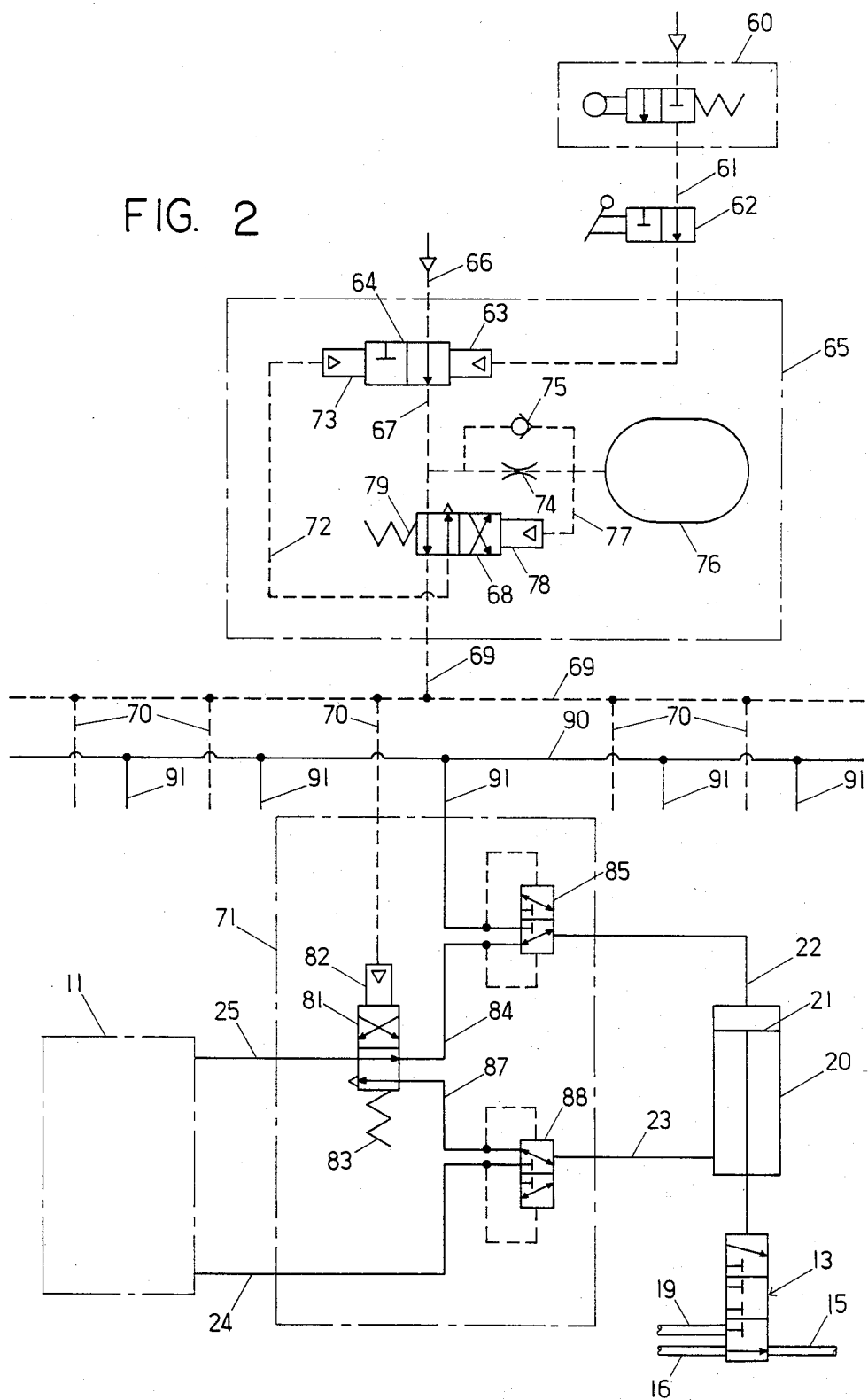
FIG. 2 is a somewhat simplified schematic view of another embodiment of a milk sweep apparatus in which all of a plurality of milk flow valves at the various stalls in the milking parlor are simultaneously controlled in the milk sweep operation.

Although the invention has been described above as operating independently at each milking stall, activated by the automatic detacher which removes the teat cup cluster from the cow, the milk sweep operation may also be carried out at several milking stalls simultaneously after all of the cows have completed milking. Such systems are particularly useful where all of the milk hoses and teat cup clusters are flushed as a group. For operation in this manner, it is preferred that the signal to start the milk sweep sequence be provided from a source which senses a condition in the parlor indicating that milking has been completed for all the cows in the parlor, such as a signal from a pressure switch 60 at the exit gate from the milking parlor. The high pressure milk sweep initiate signal from the exit gate pressure switch 60 is provided on an output line 61 through a manual on-off valve 62 to a pilot 63 of a two position valve 64 within a group milk sweep controller 65. When switched into its first position shown in FIG. 2 by high pressure on the line 61, the valve 64 passes a high pressure signal from a source line 66 to a line 67 leading through a shut-off valve 68 to a common control line 69 which has feeder lines 70 leading to individual local controls 71 at each of the milking stall positions. The valve 68, in its first position shown in FIG. 2, vents to the atmosphere a line 72 which is connected to a second pilot 73 of the valve 64. The pressure signal on the line 66 is also passed through a restrictor 74 and paralleled check valve 75 to a timing chamber 76 and a line 77 leading to a snap-action pilot 78 operating on the valve 68 against the pressure of a return spring 79. When the high pressure signal is applied to the line 67, air flows at a controlled rate through the restrictor 74 into the timing chamber 76, building up pressure within the chamber and in the line 77 at a predetermined rate. After a selected period of time, for example, 15 seconds, the pressure within the chamber 76 and applied to the line 77 is sufficient to cause the piston within the pilot 78 to move and switch the valve 68 against the pressure of the spring 79 to its second position in which the line 67 is connected to the line 72 and the control line 67 is vented to the atmosphere. The pressure on the line 72 causes the pilot 73 to switch the valve 64 to its shut-off position in which pressure from the supply line 66 is blocked. In order to allow such operation, the pilot 63 is preferably of the type 64 which moves at a selected pressure to switch the valve, which releases the pressure on the valve after it is switched so that the pilot 73 can switch the valve back without opposition.

The high pressure signal on the control signal line 69 is provided through the feeder lines 70 to each of the local controls 71 at the milking stalls. Each of the local controls 71 includes a main control valve 81 having a pilot 82 connected to the feeder line 70. When a pressure signal is presented on the control signal feeder line 70, the pilot 82 switches the valve 81 against the pressure of a return spring 83. In its first, unswitched position shown in FIG. 2, the valve 81 transmits the high pressure end of milking signal on the line 24 from the detacher controller 11 to an output line 84 leading through a shuttle valve 85 to the line 22 and thence to the air cylinder 20. The piston within the cylinder 20 is thus driven downwardly to move the milk flow valve 13 toward its second position, cutting off the vacuum on the line 16 from the milk hose 15. The valve 13 remains in this position until a milk sweep initiate signal is provided from the gate switch 60, resulting in the application of a high pressure signal onto the feeder line 70 to cause the pilot 82 to switch the valve 81 and provide the high pressure on the line 25 to an output line 87 leading through a shuttle valve 88 to the second input line 23 of the air cylinder 20. At the same time, the lines 22 and 84, leading to the portion of the cylinder 20 on the other side of the piston therein, are vented to the atmosphere, causing the air cylinder 20 to drive the valve 13 to its first, milking position in which the milk hose is in communication with the vacuum line 16 such that vacuum draw is applied to the milk hose and the teat cup cluster. The milk flow valve 13 at all of the stalls are simultaneously switched to the milking position to sweep out the rest milk. The sweep-out of the rest milk continues as the air pressure in the timing chamber 76 increases until the pressure therein is sufficient to cause the snap action pilot 78 to move the valve 68 to its second position in which the pressure signal on the line 67 is supplied to the line 72 and the line 69 is vented to the atmosphere. The pressure on the line 72 causes the pilot 73 to switch the valve 64 to a closed position. The venting of the line 69 releases the pressure on the pilots 82 of each of the main control valves 81, which are thereafter spring biased back to their initial positions in which pressure is provided to the line 84 and the line 87 is vented to the atmosphere. As a consequence, the milk flow valve 13 is moved downwardly into the backflush position where the backflush line 19 is in communication with the milk hose 15. A signal from the backflush control system (not shown in FIG. 2) may be applied to a main distribution line 90 and feeder lines 91 leading to the shuttle valves 85 to ensure that the valves 13 are moved to the backflush position.

Upon cessation of the backflushing cycle and the reinitiation of the milking cycle at each of the automatic detachers, the pressure on the line 25 is reduced to atmospheric and a high pressure beginning of milking signal is provided on the line 24. The pressure signal on the line 24 is transmitted through the shuttle valve 88 to the line 23, thereby moving the piston 21 within the cylinder 20 upwardly and driving the valve 13 to its milking position once again, where it remains during the milking of the cow.

It is understood that the invention is not confined to the particular construction and arrangement of parts herein illustrated and described but embraces such modified forms thereof as come within the scope of the following claims.

We claim:

1. Apparatus for controlling the milking vacuum applied to a teat cup cluster and the milk hose extending therefrom comprising:
   (a) a milk flow valve connected to the milk hose and having a first position in which milking vacuum is applied to the milk hose and teat cup cluster and a second position in which the milking vacuum is cut off;
   (b) drive means responsive to control signals for switching the milk flow valve between its first and second positions; and
   (c) timing and control means for providing control signals to operate the drive means to switch the milk flow valve in response thereto, the timing and control means responsive to a signal indicating the end of milking and the removal of the teat cup cluster from a cow to control the drive means to switch the milk flow valve from its first to its second position to cut off the milking vacuum to the teat cup cluster, the timing and control means also responsive thereafter to a milk sweep initiate signal to control the drive means to switch the milk flow valve from its second to its first position for a selected period of time and thereafter switching the milk flow valve back to its second position, whereby rest milk in the milk hose and teat cup cluster will tend to be drawn therefrom during the period of time the milk flow valve is switched to its second position as vacuum is applied to the open teat cups.

2. The apparatus of claim 1 including additional timing means responsive to the signal indicating the end of milking for providing the milk sweep signal to the timing and control means a selected period of time after receipt of the signal indicating the end of milking.

3. The apparatus of claim 1 including a backflush line connected to the milk flow valve and wherein when the milk flow valve is in its second position in which the milking vacuum is cut off from the milk hose the backflush line is in communication with the milk hose.

4. The apparatus of claim 1 including switch means operated by an exit gate from a milking parlor for providing the milk sweep signal to the timing and control means when the exit gate is opened to allow cows to exit from the milking parlor.

5. The apparatus of claim 1 including milk flow sensor means connected to receive milk flowing from the milk flow valve for providing an output signal indicating whether milk is flowing, and detacher control means responsive to the signal from the milk flow sensor means for providing an output signal to the timing and control means indicating the end of milking when the milk flow sensor means senses that milk is no longer flowing from the cow.

6. The apparatus of claim 5 wherein the detacher control means also provides an output signal to the drive means, indicating that milking is to begin, to control the drive means to switch the milk flow valve to its first position such that milking vacuum is supplied to the milk line and teat cup cluster.

7. Apparatus for controlling the milking vacuum applied to a teat cup cluster and the milk hose extending therefrom comprising:
   (a) a milk flow valve connected to the milk hose and having a first position in which milking vacuum is applied to the milk hose and teat cup cluster and a second position in which the milking vacuum is cut off;
   (b) drive means responsive to control signals for switching the milk flow valve between its first and second positions; and
   (c) milk sweep control means responsive to signals indicating the beginning of milking and the end of milking to operate the drive means to switch the milk flow valve, the milk sweep control means responsive to the signal indicating the beginning of milking to control the drive means to switch the milk flow valve from its second to its first position to supply milking vacuum to the teat cup cluster, the milk sweep control means responsive to the signal indicating the end of milking to control the drive means to switch the milk flow valve from its first position to its second position for a selected period of time to cut off the milking vacuum to the teat cup cluster to thereby allow the cluster to be removed from the cow, for controlling the drive means to switch the milk flow valve a selected period of time thereafter from its second to first position such that milking vacuum is again supplied to the teat cup cluster when it is removed from the cow to thereby draw out rest milk in the cup cluster and the milk hose, and after a selected period of time to control the drive means to switch the milk flow valve from its first position to its second position to cut off the milking vacuum, whereby the apparatus is ready for initiation of a new milking cycle.

8. The apparatus of claim 7 wherein the signals indicating the beginning and end of milking are pneumatic pressure signals on input lines provided to the milk sweep control means, wherein the drive means includes a two-way air drive cylinder having the piston thereof connected to the milk flow valve to operate the same, and wherein the milk sweep control means includes a main control valve receiving the air pressure signal indicating the end of milking and switchable between first and second positions, the first position of the main control valve providing the end of milking signal to the drive cylinder to cause the same to move the milk flow valve to its second position cutting off the milking vacuum, and the second position of the main control valve providing the end of milking pressure signal to the drive cylinder to cause the same to move the milk flow valve from its second position to its first position in which the milking vacuum is applied to the milk hose and teat cup cluster.

9. The apparatus of claim 8 wherein the control valve has two snap action pilots which switch the same between its first and second positions, the pilots operable to switch the valve when the pressure control signal provided to the pilots exceeds a predetermined pressure, and including a control line receiving the pressure signal indicating the end of milking and providing such pressure signal to the first of the pilots through a restrictor and with a timing chamber connected thereto such that the pressure on the first pilot will build up over a period of time after the end of milking signal and will switch the main control valve from its first to its second position after the selected period of time has elapsed, and including another control line extending from the output of the control valve through a restrictor to the second pilot with a timing chamber connected thereto such that when the control valve is switched to its second position, air pressure will build up in the timing chamber connected to the second control line and will reach a pressure sufficient to operate the second snap action pilot after a selected period of time to switch the control valve from its second to its first position.

10. The apparatus of claim 7 wherein the milk flow valve has a second position in which the milking vacuum is cut off from the milk hose and a backflush line is in communication with the milk hose.

11. The apparatus of claim 7 including milk flow sensor means connected to receive milk flowing from the milk flow valve for providing an output signal indicating whether milk is flowing, and detacher control means responsive to the signal from the milk flow sensor means for providing an output signal to the milk sweep control means indicating the end of milking when the milk flow sensor means senses that milk is no longer flowing from the cow.

12. The apparatus of claim 11 wherein the detacher control means also provides the signal to the milk sweep control means indicating the beginning of milking.

13. Apparatus for controlling the milking vacuum applied to the teat cup clusters and milk hoses at several milking stalls in a milking parlor simultaneously, comprising:
(a) milk flow control apparatus at each milking stall comprising:
(1) a milk flow valve connected to the milk hose and having a first position in which milking vacuum is applied to the milk hose and teat cup cluster and a second position in which the milking vacuum is cut off,
(2) drive means responsive to control signals for switching the milk flow valve between its first and second positions,
(3) local control means, responsive to signals indicating the beginning and end of milking and to a control signal, for controlling the drive means to switch the milk flow valve to its first position when the beginning of milking signal is received by it, or when the end of milking signal and the control signal are simultaneously received by it, and for controlling the drive means to switch the milk flow valve to its second position when the end of milking signal only is received;
(b) parlor sensing means for providing a milk sweep initiate signal in response to a condition sensed in the milking parlor;
(c) group milk sweep control means, receiving the milk sweep initiate signal from the parlor sensing means, for providing the control signal to the local control means at each milking stall upon receipt of the milk sweep initiate signal to thereby cause the milk flow valve at each stall to be switched to its first position to provide vacuum draw to the milk hose and teat cup cluster, and for terminating the control signal to the local control means at each stall a preselected period of time thereafter, whereby the milk flow valves are switched to their second positions to cut off the milking vacuum.

14. The apparatus of claim 13 wherein the signals indicating the beginning and end of milking and the milk sweep initiate signal from the parlor sensing means are pneumatic pressure signals, wherein the drive means includes a two-way air drive cylinder having the piston thereof connected to the milk flow valve to operate the same, wherein the local control means includes a main control valve receiving the air pressure signal indicating the end of milking and switchable between first and second positions, the first position of the main control valve providing the end of milking signal to the drive cylinder to cause the same to move the milk flow valve to its second position cutting off the milking vacuum, and the second position of the main control valve providing the end of milking pressure signal to the drive cylinder to cause the same to move the milk flow valve from its second position to its first position in which the milking vacuum is applied to the milk hose and teat cup cluster.

15. Apparatus of claim 14 wherein the group milk sweep control means includes a two-position valve operated by a pair of pilots and receiving air pressure at its input port and passing the same through the valve in its first position and blocking the air pressure input signal in its second position, one of the pilots on the valve connected to receive the milk sweep initiate signal to switch the valve to its first position, the output of the valve connected to pass through a shutoff valve operated by a snap action pilot to switch between first and second positions, the air pressure signal from the two-way valve being passed through the shutoff valve when the shutoff valve is in its first position and being directed to the second pilot of the two-position valve when the shutoff valve is in its second position to thereby switch the two-position valve to shut off the flow of air therethrough, the pilot of the shutoff valve connected to the air pressure signal passed through the two-position valve by a control line passing through a restrictor and having a timing chamber connected thereto such that the air pressure on the pilot of the shutoff valve builds up gradually over a selected period of time until reaching the pressure at which the pilot snaps to switch the shutoff valve from its first to its second position, the output of the shutoff valve being provided as the control signal to the local control means at the milking stalls.

16. The apparatus of claim 13 wherein the milk flow valve has a second position in which the milking vacuum is cut off from the milk hose and a backflush line is in communication with the milk hose.

17. The apparatus of claim 13 including milk flow sensor means, connected to receive milk flowing from the milk flow valve, for providing an output signal indicating whether the milk is flowing, and detacher control means responsive to the signal from the milk flow sensor means for providing an output signal to the local control means indicating the end of milking at the milking stall when the milk flow sensor means senses that milk is no longer flowing from the cow.

18. The apparatus of claim 13 wherein the detacher control means also provides a signal to the local control means indicating the beginning of milking.

19. A method of conserving the milk produced by a cow during a milking cycle which includes flushing the milk hose and teat cup cluster, comprising the steps of:
(a) cutting off the milking vacuum to the milk hose and teat cup cluster when the flow of milk from the cow has ceased and then removing the cluster from the cow and to a location where contaminating material cannot enter the cup inflations;
(b) waiting for a selected period of time after the milking vacuum has been cut off and the teat cup cluster has been removed from the cow;
(c) thereafter applying the milking vacuum to the milk hose and teat cup cluster for a selected period of time while the teat cup cluster is removed from the cow such that air can be drawn in through the open inflations to the teat cups to draw the remaining rest milk from the milk hose and teat cup cluster;
(d) thereafter shutting off the vacuum to the milk hose and teat cup cluster; and
(e) supplying backflush solution to the milk hose and teat cup cluster such that the backflush solution flows through the hose and cluster and out the teat cup inflations.

* * * * *